UNITED STATES PATENT OFFICE.

HENRY KOCH, OF CHICAGO, ILLINOIS.

EGG-PRESERVING COMPOUND.

SPECIFICATION forming part of Letters Patent No. 574,911, dated January 12, 1897.

Application filed September 30, 1896. Serial No. 607,389. (No specimens.)

*To all whom it may concern:*

Be it known that I, HENRY KOCH, a citizen of the United States, residing at Chicago, in the county of Cook and State of Illinois, have invented a new and useful Improvement in Egg-Preserving Compounds, of which the following is a specification.

My invention relates to compounds for preserving eggs, and particularly to such as are used in the form of a thin coating on the shell designed to exclude the air from the egg.

The objects of my invention are to provide a compound which may be applied to the egg-shell in liquid form, will readily harden into an air-tight transparent coating, and which will not crack in the course of ordinary handling of eggs which have been coated with same.

Silicate of sodium has heretofore been used as an ingredient of different compounds, but one of the objections to its use has been that the coating would become brittle, so that same would readily crack in handling the egg.

I have discovered that by mixing rice-flour with silicate of sodium the above-mentioned objection is entirely overcome, and that while the coating so formed will retain its transparent, odorless, air-excluding qualities it will also have a certain elasticity which will render same proof against being cracked in ordinary handling.

I prepare my compound by thoroughly stirring one ounce of finely-powdered rice-flour in about four ounces of cold water, then mixing same with about sixteen ounces of liquid glass or silicate of sodium of about the consistency of ordinary table-syrup. I then apply this liquid to the egg with a brush, so as to rub same well into the pores of the shell, and allow same to dry. The eggs may then be stored either with or without packing. The eggs may afterward be frequently handled, packed in baskets, &c., without danger of cracking the coating. It will be seen that this feature is important, since a slight cracking in the coating would admit the air to the shell, when same would pass through to the egg, the coating then becoming practically useless as a preservative.

Gum-arabic and glue have heretofore been mixed with silicate of sodium for the purpose of making a tough preservative coating. There are, however, several objections to the use of either gum-arabic or glue, among which are the expense, the odor, and, chiefly, the fact that a coating in which either of these substances is used will not permit the egg shell to be broken in its natural manner when it is desired to use the egg. When either of the last-mentioned substances is used, a tough film is formed which must be torn rather than broken, and therefore prevents the shell from being readily broken around the middle in the usual manner. The coating which I use overcomes this objection entirely, and while it is somewhat elastic it will permit the shell to be broken open in like manner, as if same were not coated.

A further advantage in the use of rice-flour is that the fine particles prevent the varnished appearance which varnish, glue, or gum-arabic give to the coating.

What I claim, and desire to secure by Letters Patent, is—

The herein-described compound to be used for preserving eggs, consisting of silicate of sodium, rice-flour, and water in about the proportion specified.

HENRY KOCH.

Witnesses:
 WM. R. RUMMLER,
 FRED A. SPIES.